United States Patent [19]

Sharp

[11] Patent Number: 4,466,594
[45] Date of Patent: Aug. 21, 1984

[54] IMPACT-DISPLACEABLE REAR VIEW MIRROR MOUNTING

[75] Inventor: Bernard C. Sharp, White Plains, N.Y.

[73] Assignee: Parker-Hannifin Corporation, Shelton, Conn.

[21] Appl. No.: 281,581

[22] Filed: Jul. 9, 1981

[51] Int. Cl.³ ............................................. B60R 1/02
[52] U.S. Cl. .................................. 248/484; 248/487; 248/900
[58] Field of Search ................ 248/745, 289.3, 475 B, 248/477, 478, 479, 481, 484, 487

[56] References Cited

U.S. PATENT DOCUMENTS

| | | | |
|---|---|---|---|
| 1,031,075 | 7/1912 | Lundin | 248/478 X |
| 1,972,246 | 9/1934 | Saver | 248/481 |
| 2,089,463 | 8/1937 | Ritz-Woller | 248/481 |
| 2,565,012 | 8/1951 | Barrett | 248/475 B X |
| 2,683,013 | 7/1954 | Amundson et al. | 248/145 |
| 3,583,734 | 6/1971 | Magi | 248/475 B X |
| 3,993,281 | 11/1976 | McCarroll | 248/475 B X |

FOREIGN PATENT DOCUMENTS

| | | | |
|---|---|---|---|
| 474303 | 6/1951 | Canada | 248/475 B |
| 575281 | 4/1958 | Italy | 248/478 |
| 320231 | 10/1929 | United Kingdom | 248/477 |
| 678241 | 8/1952 | United Kingdom | 248/477 |
| 2041857 | 9/1980 | United Kingdom | 248/475 B |

Primary Examiner—William H. Schultz
Attorney, Agent, or Firm—Albert C. Johnston

[57] ABSTRACT

A mounting for a rear view mirror comprises a bracket member to be fastened to a vehicle door or body surface, a coupling member joined with the bracket member so that the coupling member can be set about a horizontal axis for any desired angle of protrusion from the bracket member, and a mirror supporting arm connected with the coupling member and normally latched in a protruded viewing position but releasably latched so that the arm will be turned about a vertical axis and thus folded toward the vehicle under an abnormal force at its outer end, such as an impact against the supported mirror head. The mounting structure serves for a mirror installed on either side of a vehicle, reducing the hazards of outboard mirrors such as those required for trucks or trailers.

7 Claims, 4 Drawing Figures

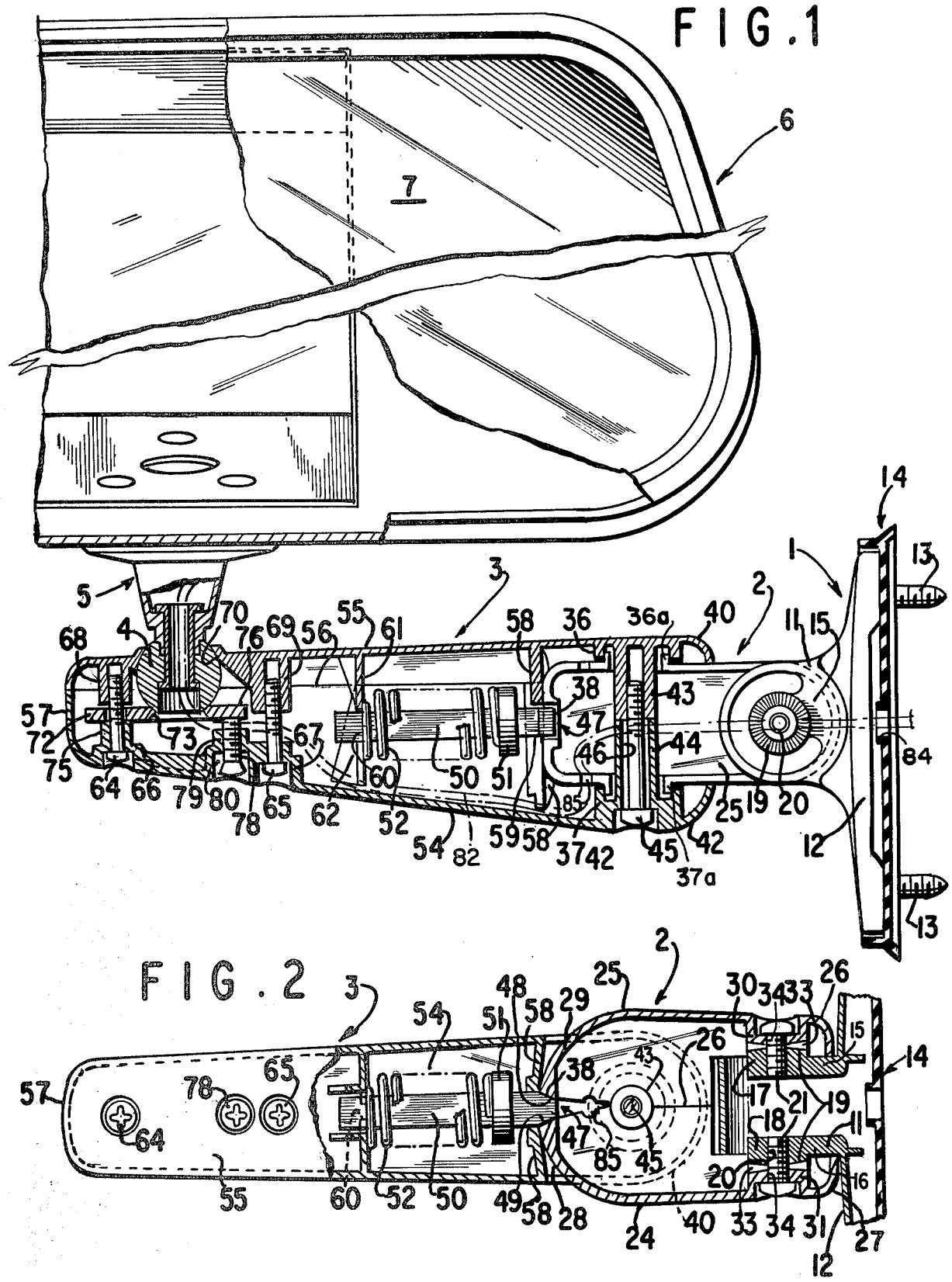

IMPACT-DISPLACEABLE REAR VIEW MIRROR MOUNTING

This invention relates to an impact-displaceable mounting or support structure for holding a rear-view mirror protruded in viewing position from a body or door surface of a vehicle.

Motor vehicles such as passenger automobiles recently have been equipped with "flag" type rear view mirrors as a safety measure. Such a mirror typically comprises an elongate, generally polygonal mirror head connected near one end thereof with a mounting bracket so that when the bracket is attached to a side of a vehicle body, such as to a surface of a body door or a fender, the head in viewing position may be pivoted inward by an impact or upon engaging an obstruction in its path on the vehicle. Thus, the risk of injury to a person or an object in the path of the mirror head is reduced, as well as the risk of damage to the head or other parts of the mirror assembly.

Needs have continued to exist for a satisfactory rear view mirror mounting or support structure by which the risks of damage or injury from impacts of a mirror head with an obstruction or a person in its path can be reduced in the case of a mirror disposed in a viewing position considerably outboard of a vehicle body or door surface, as required for instance for trucks or for automobiles or cabs having trailers attached to them.

The principal object of the present invention is to provide a rear view mirror mounting that will meet such needs by being displaceable or foldable away from its normal outboard viewing position under a force or impact against a mirror head supported on the mounting.

Another object of the invention is to provide such a mirror mounting structure which can be installed on a vehicle body or door surface having any of various slopes relative to the horizontal, with the mounting easily adapted to the slope of the mounting surface so that in any case it will hold a mirror head protruded horizontally outward from the vehicle body in viewing position.

Still another object is to provide such a mirror mounting structure which is suited for mounting a rear view mirror outboard from either the left side or the right side of the driver's compartment, or cab, of a truck or other motor vehicle; and, still further, to provide such a structure which is suited for entraining wiring to a motorized rear view mirror head for remote control of the mirror viewing position.

According to the present invention, a rear view mirror mounting is provided which comprises a bracket member to be fixed to a vehicle body or door surface, an arm having on its outer means for mounting a mirror support thereon, and an arm coupling member having thereon inner means engaged with means on the bracket member and outer means engaged with means on the inner end of the arm for normally holding the arm protruded horizontally outward from the coupling member yet yieldably holding the arm so that it is displaceable by a force against its outer end in either direction about a substantially vertical axis at the coupling member.

In an advantageous form of the mounting structure the arm is provided with upper and lower inner end portions that straddle an outer portion of the coupling member and are journalled with it so that the arm can be turned relative to the coupling member about a substantially vertical axis, and coengaging means provided in the arm and in the outer portion of the coupling member normally hold the arm protruded in a mirror viewing position but yield under a force against the outer end of the arm, such as the force of an impact against this end or against a mirror head supported on it, so that the arm under impact will be turned away and inward about the vertical axis at the coupling member.

According to another feature of the invention, the bracket member comprises a post protruding from a bracket base formed to be fixed to a vehicle body or door surface; the coupling member comprises inner end portions disposed at and clampable against opposite sides of the post; and these sides and the adjacent end portions of the coupling member are formed with mating elements which are interengaged so as to prevent relative movement of the coupling and bracket members when the coupling end portions are clamped against the post yet, when they are not so clamped, permit the coupling member to be turned about a substantially horizontal axis to any desired angle of protrusion from the bracket base. Thus, the coupling member and the mirror-supporting arm can be disposed in the required viewing position irrespective of the slope relative to the horizontal of the body or door surface to which the bracket member is fixed. Moreover, the mounting structure serves equally well for mounting a rear view mirror to either the left side or the right side of a vehicle.

According to another feature of the mirror mounting, an outer end portion of the arm comprises a socket to receive and hold pivotably a swivel ball on a mirror support protruding upward from the arm, and contains a friction plate to bear against this ball at a side of the ball opposite the socket, together with means accessible at the underside of the arm for setting the friction plate to a desired pressure against the swivel ball. Thus, a rear view mirror head mounted on the mirror support can be held upright in the desired viewing position and can be easily adjusted in position, if need occurs, by being turned about the center of the swivel ball against the resistance imposed through the friction plate, or with the friction plate loosened.

The mirror mounting of the invention can be adapted to be fitted with electrical wiring enclosed within its structures and leading to a motorized mechanism inside a mirror head supported on the arm, for remote control from a driver's location of the viewing position of a mirror plate mounted in the head. For this purpose, the bracket member, coupling member, arm body, friction plate, swivel ball and mirror support are provided with respective inter-communicating cavities, or passageways, through which electrical wiring can be entrained into the mirror head.

The above-mentioned and other objects, features and advantages of the invention will be further apparent from the following detailed description and the accompanying drawings of an illustrative, preferred embodiment of the invention. In the drawings:

FIG. 1 is a longitudinal vertical sectional view of a rear view mirror mounting embodying the invention, with a mirror head supported thereon;

FIG. 2 is a bottom plan view of the mirror mounting structure, with some of the parts shown in longitudinal cross-section;

Figure 3:
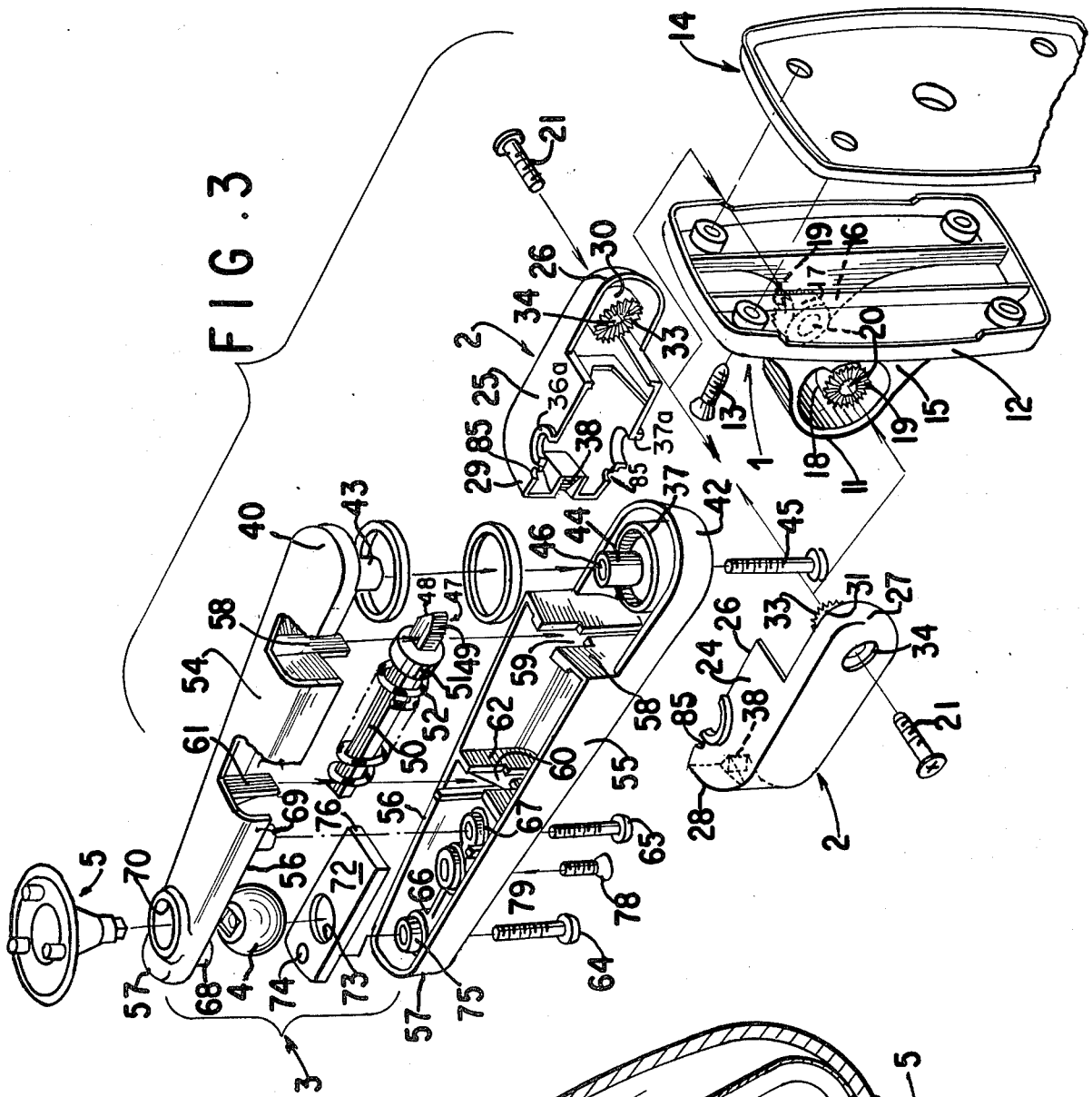
FIG. 3 is an exploded perspective view of parts of the mirror mounting structure.
Figure 4:
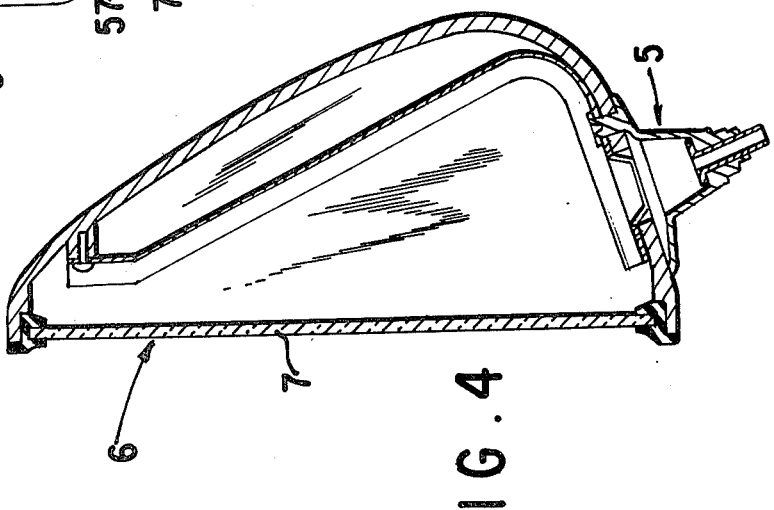
FIG. 4 is a transverse cross-sectional view of the mirror head and part of its support post.

As may be seen in FIGS. 1 and 2, a rear view mirror mounting according to the present invention comprises as its principal components a bracket member 1, a coupling member 2 and a mirror supporting arm 3. Arm 3 carries at its outer end a swivel ball element 4 of an upwardly protruding support post 5 having a rear view mirror head 6 fixed to its upper end. FIG. 4 indicates a dispostion of the mirror head and post 5 for holding a mirror plate 7 of the head in a substantially vertical viewing plane. The mirror head and the swivel support post as shown are merely illustrative, as various forms of rear view mirror heads and connected supports may be fixed in various ways to an arm similar to arm 3 so as to be held in viewing position outboard of a vehicle door or body surface by a mounting device in accordance with the invention.

The bracket member 1 is a rigid part comprising a post 11 protruding from a wider base portion 12 formed to receive fasteners such as headed screws 13 for securing the bracket member to a vehicle body surface. Member 1 may be, for instance, a unitary casting of a suitable zinc alloy or of other relatively lightweight structural material.

A mounting pad 14 of rubber or other elastomeric material is provided as a cushioning seat for the bracket base 12. The post 11, which may be hollow, presents at opposite sides thereof surfaces 15 and 16 to be disposed substantially vertically, and embossments 17 and 18 protrude from those surfaces. Each of the embossments 17 and 18 is formed with a laterally facing, circular series of serrations or teeth 19, and is formed at their center with a threaded bore 20 to receive a screw 21.

The coupling member 2 is constituted by two dished parts, or coupling halves, 24 and 25 having edges which mate along a central vertical plane 26 of the mounting assembly. The member 2 is formed near its inner end with means engaged with part of the bracket member for holding member 2 at a desired angular position relative to a horizontal axis at the bracket memeber. Near its outer end member 2 is formed with means engaged with means on the inner end of arm 3 for yieldably holding the arm protruded outward from the coupling member yet displaceable by a force against the outer end of the arm in either direction about a substantially vertical axis at the coupling member. For these purposes, the coupling halves 24 and 25 have inner, or backward, end portions 26 and 27 which straddle and are clampable against the post 11 at its opposite sides 15 and 16, and their outer portions 28 and 29 are formed to be straddled at their upper and lower sides by, and to be engaged pivotably with, vertically spaced inner end portions 40 and 42 of the mirror arm 3.

The backward end portions 26 and 27 of the coupling member halves are formed with embossments 30 and 31, respectively, which confront the embossments 17 and 18 on the post 11 of bracket member 1. The embossments 30 and 31 are each provided with a laterally facing, circular series of teeth 33 which interengage with a series of teeth 19 formed on the post 11. Each of the embossments 30 and 31 also has an opening 34 therethrough at a location radially inside the teeth thereon, which opening is aligned with one of the bores 20 and has one of the headed screws 21 fitted through it and threaded into the adjacent bore 20 so as to hold the coupling halves 24 and 25 clamped tightly against the post 11, and clamped tightly together, when the screws 21 are tight. On the other hand, when the screws 21 are each loosened by a turn or two, the coupling member and the arm 3 extending from it can be ratcheted upward or downward about the axis of the screws so as to adjust the coupling member to any desired angular position relative to the bracket member 1, so relative to a vehicle door surface or the like on which it is mounted, as required for the installation or the service of a mirror supported on arm 3.

The arm and portions 40 and 42 comprise integral hub formations 36 and 37 that interfit with bearing formations 36a and 37a on the outer end portion of coupling member so that the arm 3 can be turned relative to the coupling member about the axis of the hub formations. Inside the hub formations 36 and 37 are cylindrical protrusions 43 and 44. One of these, preferably the upper one 43, is hollow and screw-threaded to receive the threaded shank of a headed screw 45 that extends through a bore 46 in the other protrusion 44. When the screw 45 is fixed in place, the arm end portions 40 and 42 are fastened together via the protrusions and screw 45, which then hold the hub formations aligned substantially vertically on the bearing formations 36a and 37a so that the arm 3 can be pivoted horizontally relative to the coupling member.

The outer end portion of the coupling member 2 is formed also with a detent element 38, which for instance is a notch provided between confronting front edge portions of the coupling member halves 24 and 25 and is engaged by a mating detent element 47 on the end of a latching detent pin 50 supported slidably in the arm 3. The latching pin has a flange 51 thereon inside the arm 3, which flange is pressed by a spring 52 so that the end 47 of pin 50 normally will be held engaged in the notch 38 and thus will hold the mirror arm 3 latched in a protruded, mirror viewing position. The latching pin end 47 has oppositely sloped side surfaces 48 and 49 that fit slidably against mating side surfaces of the notch 38 so that under an abnormal force against the outer end of arm 3, the resultant torque on the detent element 47 will force this element out of the notch 38 against the force of the spring 52, thus letting the arm 3 turn or fold inward toward the vehicle surface supporting the bracket member 1.

The mirror arm 3 in the form shown has a substantially closed, elongate hollow body formed by mating upper and lower dished body members 54 and 55. These members have respective side walls formed with edges which meet along a substantially horizontal plane or parting line 56 extending from the outer end 57 of the arm 3 to a partition 58 located near the outer end of the coupling member 2. The inner end portions 40 and 42 of the arm 3 are backward extensions of the dished members 54 and 55, respectively.

The partition 58 comprises a downward web formation on body member 54 and laterally spaced upright web formations on body member 55, which together form a bearing 59 supporting the latching member 50 near its working end 49. The other end of the latching member is supported in a bearing 60 formed between another downward web formation 61 on member 54 and laterally spaced upright web formations 62 on member 55. These web formations also form a seat for the coiled spring 52, which is compressed between them and the flange 51 on member 50.

The arm body members 54 and 55 are secured together near their outer end 57 by suitable fasteners, such as headed screws 64 and 65. The shanks of these fasteners extend, respectively, through openings in pockets 66 and 67 formed in the bottom of member 55 and are threaded into cylindrical retainers 68 and 69 extending downward from member 54.

The swivel ball 4 on the mirror support post 5 is held in an outer end portion of the arm 3, as at a location between the fasteners 64 and 65. The ball is seated pivotably in and part of its upper side protrudes through an open spherical socket 70 formed in the upper arm body member 54. The ball is restrained to any desired angular position of the post 5 and mirror head 6 by a friction plate 72 which is formed with an opening 73 to receive and to let the plate 72 bear evenly against part of the lower side of the ball.

One end 74 of the friction plate 72 is formed with a bore engaged loosely over the shank of screw 64. End 74 seats on an extension 75 of pocket 66. The opposite end 76 of the friction plate is engaged by the end of a set screw 78 which is threaded through a cylindrical retainer 79 extending upward from a screw pocket 80 formed in the lower body member 55. The head of the set screw seats in pocket 80 and is accessible from the under side of arm 3 for adjusting this screw to any denied pressure against end 76 of the friction plate, thus holding the friction plate pressed against the ball 4 at opening 73 so that the swivel support post 5 and the mirror head 6 will be kept securely, though at all times adjustably, in a desired viewing position relative to the arm 3.

The mirror mounting structure of the illustrated embodiment is adapted for supporting a rear view mirror head of any of various forms or types, among which are motorized mirror heads which contain electrical motor means for adjusting the mirror viewing position by remote control through electrical wiring extending from a location inside a vehicle. The electrical wiring required for such a motorized rear view mirror head can be led to the head through the components of the disclosed mounting structure as indicated by the dashed lines at 82 in FIG. 1 of the drawings. For this purpose, the pad 14 of the bracket member is formed with an opening 84 through which the wiring passes into and through the hollow post 11, thence through the outer portion of the coupling member 2, passing to a side of trunnion member 43 or 44 therein and from member 2 through an opening 85, thence through the elongate chamber of arm 3, passing between the upright web formations on body member 55 and to a side of the screws 65 and 79, and thence into the mirror head through a tubular passageway 86 provided in the swivel ball 4 and support post 5.

The coupling halves 24 and 25 and the arm body members 54 and 55 can each be produced advantageously as a unitary casting of a material like that used for the bracket member 1.

It will be apparent that the new features of the invention disclosed can be employed in various structures differing in form or arrangement from the embodiment shown in the drawings and described hereinabove. The invention is not intended to be limited to features of that embodiment except as may be required for fair construction of the appended claims.

What is claimed is:

1. An impact-displaceable rear view mirror mounting comprising a bracket member to be fixed to a vehicle body or door surface, an arm having on its outer end means for mounting a mirror support thereon, and an arm coupling member having thereon inner means engaged with means on said bracket member and outer means engaged with means on the inner end of said arm for normally holding said arm protruded outward from said coupling member yet yieldably holding said arm so that it is displaceable by a force against said outer end in either direction about a substantially vertical axis at said coupling member, said bracket member comprising a base portion having a post protruding therefrom, said coupling member comprising inner end portions disposed at and clampable against opposite sides of said post, said end portions and said sides having thereon mating elements which are interengaged so as to prevent relative movement of said members when said end portions are clamped against said post and which, when said end portions are not so clamped, permit said coupling member to be turned about a substantially horizontal axis to an angle of protrusion from said base portion suited to the slope of a said body or door surface.

2. A mirror mounting according to claim 1, said inner end portions and said sides of said post having thereon confronting embossments, said mating elements comprising sets of respective interengaging teeth on the adjacent faces of said embossments.

3. A mirror mounting according to claim 2, each said embossment on said post having a bore therein radially inside the teeth thereon and the embossment on each said end portion having an opening therein aligned with a said bore, and screw means extending through said openings and into said bores for clamping the said end portion to said post, said screw means when loosened providing a substantially horizontal axis for turning movement of said coupling member relative to said bracket member.

4. An impact-displaceable rear view mirror mounting comprising a bracket member to be fixed to a vehicle body or door surface, an arm having on its outer end means for mounting a mirror support thereon, and an arm coupling member having thereon inner means engaged with means on said bracket member and outer means engaged with means on the inner end of said arm for normally holding said arm protruded outward from said coupling member yet yieldable holding said arm so that it is displaceable by a force against said outer end in either direction about a substantially vertical axis at said coupling member;

said arm having upper and lower inner and portions straddling an outer portion of said coupling member and journalled therewith so that said arm can be turned relative thereto about a substantially vertical axis, said arm and said outer portion having therein coengaging means which normally hold said arm protruded in a mirror viewing position but which yield under a said force to enable turning movement of said arm;

said outer portion of said coupling member having upper and lower cylindrical bearing formations thereon, said inner end portions of said arm having thereon respective cylindrical hub formations fitting with said bearing formations to provide a substantially vertical axis for turning movement of said arm.

5. A mirror mounting according to claim 4, said inner end portions of said arm also having thereon integral protrusions located inside said bearing and hub formations and joined together endwise so as to hold said hub formations substantially vertically aligned for turnably supporting said arm on said coupling member.

6. An impact-displaceable rear view mirror mounting comprising a bracket member to be fixed to a vehicle body or door surface, an arm having on its outer end means for mounting a mirror support thereon, and an arm coupling member having thereon inner means engaged with means on said bracket member and outer means engaged with means on the inner end of said arm for normally holding said arm protruded outward from said coupling member yet yieldably holding said arm so that it is displaceable by a force against said outer end in either direction about a substantially vertical axis at said coupling member;

said mirror support mounting means comprising in an outer end portion of said arm a socket to receive and hold pivotally a swivel ball on a mirror support protruding upward from said arm, a friction plate to bear against said ball at a side thereof opposite said socket and means accessible at the underside of said arm for setting said friction plate to a desired pressure against said swivel ball;

said arm being constituted by upper and lower body members fitting and fastened together vertically to form a substantially closed chamber from the outer end of said arm to an outer portion of said coupling member, said body members having respective inner end portions extending over upper and lower sides of said outer portion and journalled with said coupling member so that said arm is turnable relative thereto about a substantially vertical axis, and coengaging means respectively on said arm and said coupling member for normally holding said arm protruded in a mirror viewing position yet yieldably holding said arm so that it is displaceable in either direction about said vertical axis by a force against said outer end;

said bracket member, said coupling member, said arm chamber, said friction plate, said swivel ball and said mirror support having respective intercommunicating passageways therein through which electrical wiring can be led into a mirror head held on said support.

7. An impact-displaceable rear view mirror mounting comprising a bracket member to be fixed to a vehicle body or door surface, an arm having on its outer end means for mounting a mirror support thereon, and an arm coupling member having thereon inner means engaged with means on said bracket member and outer means engaged with means on the inner end of said arm for normally holding said arm protruded outward from said coupling member yet yieldably holding said arm so that it is displaceable by a force against said outer end in either direction about a substantially vertical axis at said coupling member;

said arm being constituted by upper and lower body members fitting and fastened together vertically to form a substantially closed chamber from the outer end of said arm to an outer portion of said coupling member, said body members having respective inner end portions extending over upper and lower sides of said outer portion and journalled with said coupling member so that said arm is turnable relative thereto about a substantially vertical axis, and coengaging means respectively on said arm and said coupling member for normally holding said arm protruded in a mirror viewing position yet yieldably holding said arm so that it is displaceable in either direction about said axis by a force against said outer end;

said outer portion of said coupling member having upper and lower cylindrical bearing formations thereon, said inner end portions of said arm having thereon respective cylindrical hub formations fitting with said bearing formations to provide a substantially vertical axis for turning movement of said arm; said inner end portions of said arms also having thereon integral protrusions located inside said bearing and hub formations and joined together endwise so as to hold said hub formations substantially vertically aligned for turnably supporting said arm on said coupling member;

said coengaging means including a detent notch in said outer portion of said coupling member, said notch having sloped side surfaces, a detent pin mounted slidably in said arm, said pin having on an end thereof sloped surfaces mating with said notch surfaces, and spring means normally holding said pin in a latching position in which said pin end is engaged in said notch to hold said arm in mirror viewing position, said sloped surfaces being operative under a certain torque on said arm in horizontal direction to displace said pin end out of said notch against the force of said spring means and thus enable turning of said arm by said torque.

* * * * *